United States Patent [19]

Iacoviello et al.

[11] Patent Number: 4,999,239

[45] Date of Patent: Mar. 12, 1991

[54] ETHYLENE-VINYL CHLORIDE COPOLYMER EMULSIONS CONTAINING TETRAMETHYLOL GLYCOLURIL FOR USE AS BINDER COMPOSITIONS

[75] Inventors: John G. Iacoviello; George Davidowich, both of Allentown; Bheema R. Vijayendran, Emmaus; John S. Sadowski, Kutztown, all of Pa.

[73] Assignee: Air Products and Chemicals, Inc., Allentown, Pa.

[21] Appl. No.: 531,974

[22] Filed: May 31, 1990

Related U.S. Application Data

[62] Division of Ser. No. 326,144, Mar. 30, 1989, Pat. No. 4,962,141.

[51] Int. Cl.$^5$ .................. B01D 39/18; B32B 27/26; B32B 27/30
[52] U.S. Cl. .................. 428/288; 162/135; 210/508; 428/290; 428/514
[58] Field of Search .............. 428/288, 290, 514; 210/508; 162/135

[56] References Cited

U.S. PATENT DOCUMENTS

| | | | |
|---|---|---|---|
| 3,501,440 | 3/1970 | Kamio et al. | 260/77.5 |
| 3,895,167 | 6/1975 | Gor | 260/851 |
| 4,189,415 | 2/1980 | Eck et al. | 260/29.6 |
| 4,528,315 | 6/1985 | Eck et al. | 524/458 |
| 4,623,462 | 11/1986 | Urig et al. | 210/496 |
| 4,673,702 | 6/1987 | Iacoviello | 524/459 |
| 4,714,731 | 3/1987 | Iacoviello | 524/459 |
| 4,716,192 | 12/1987 | Iacoviello | 524/549 |
| 4,847,143 | 7/1989 | Watanabe et al. | 428/514 |

*Primary Examiner*—James C. Cannon

[57] ABSTRACT

Aqueous emulsions containing an ethylene-vinyl chloride (EVCl) copolymer and tetramethylol glycoluril are described for use as binder compositions suitable for application onto nonbonded filter paper. The emulsions are prepared by incorporating 4 to 10 wt % tetramethylol glycoluril, based on the total weight of the emulsion copolymer, into an aqueous dispersion of a copolymer consisting essentially of 65 to 90 wt % vinyl chloride, 5 to 35 wt % ethylene and optionally, up to 10 wt % of a hydroxyalkyl- or carboxylic acid-containing functional comonomer. The polymerization is conducted in the presence of a stabilizing system consisting essentially of 3 to 15 wt % polyvinyl alcohol. Filter paper impregnated with these emulsions maintain tensile strength and flexibility upon being subjected to hot oil.

17 Claims, No Drawings

ETHYLENE-VINYL CHLORIDE COPOLYMER EMULSIONS CONTAINING TETRAMETHYLOL GLYCOLURIL FOR USE AS BINDER COMPOSITIONS

TECHNICAL FIELD

The present invention relates to polyvinyl alcohol stabilized ethylene-vinyl chloride (EVCl) copolymer emulsions and polymer coatings deposited from such emulsions.

BACKGROUND OF THE INVENTION

Polyvinyl alcohol stabilized aqueous emulsions containing ethylene-vinyl chloride (EVCl) copolymers are commonly used as film formers or binders for coating, adhesive and saturation applications. However, substrates impregnated with such emulsions typically experience a measurable loss in structural integrity when exposed to nonaqueous solvents such as methyl ethyl ketone, mineral spirits and the like. Numerous formulations have been developed in an effort to overcome the diminished solvent resistance exhibited by substrates impregnated with these emulsions.

U.S. Pat. No. 3,501,440 discloses the copolymerization of vinyl chloride and ethylene and other copolymerizable monomers including methyl acrylate and butyl acrylate in the presence of a free radical catalyst. Reference examples 5-6 teach the use of polyvinyl alcohol as a suspending agent in the copolymerization of ethylene and vinyl chloride.

U.S. Pat. No. 3,895,167 discloses a metal coating composition comprising a vinyl chloride-ethylene copolymer and a heat curable, thermosetting aminoplast resin mixture of a methylolated ethyleneurea resin and an alkylated triazine/formaldehyde condensate. The vinyl chloride-ethylene copolymer compositions must necessarily be prepared from a mixture of the methylolated ethyleneurea resin and the condensate. Omission of either of these aminoplast resins from the copolymer recipe renders the composition unsuitable for metal coating applications.

U.S. Pat. No. 4,189,415 discloses an aqueous emulsion containing a vinyl chloride-vinyl acetate-ethylene copolymer and polyvinyl alcohol as the sole protective colloid. Depending upon the desired application, from 0.5 to 5 wt % of an olefinically unsaturated N-methylolamide such as N-methylolacrylamide is added to the polymer premix.

U.S. Pat. No. 4,528,315 discloses a process for preparing aqueous copolymer emulsions of vinyl halides and/or vinyl esters and additional monomers in the absence of emulsifying agents. Example 9 teaches a vinyl chloride-vinyl acetate-ethylene copolymer also containing hydroxypropyl acrylate, acrylamide and acrylic acid.

U.S. Pat. No. 4,623,462 discloses a filter substrate which is impregnated with a water-based binder comprising a latex containing at least 20 wt % polymerized vinyl chloride in the latex solids. The latex is an aqueous emulsion containing a copolymer of vinyl chloride, 30 to 60 wt % lower alkyl acrylate and one or more comonomers selected from acrylic acid and N-methylol acrylamide. Such comonomers may be added to the polymer premix in an amount up to 5 wt % based on the total weight of the monomers. The binder also contains 5 to 20 wt % of a crosslinking resin based upon the weight of the latex solids.

U.S. Pat. Nos. 4,673,702, 4,714,731 and 4,716,192 disclose polyvinyl alcohol-stabilized vinyl chloride-ethylene copolymer emulsions as coatings for metal substrates. Such emulsions comprise from 20 to 70 wt % of a copolymer colloidally dispersed in an aqueous medium, the copolymer comprising 65 to 90 wt % vinyl chloride, 5 to 35 wt % ethylene and 0 to 10 wt % olefinically unsaturated copolymerizable monomer. Suitable copolymerizable monomers include N-isobutoxymethylacrylamide and N-methylolacrylamide.

SUMMARY OF THE INVENTION

Polyvinyl alcohol-stabilized aqueous emulsions containing an ethylene-vinyl chloride (EVCl) copolymer and tetramethylol glycoluril are disclosed which demonstrate enhanced resistance to hot oil when deposited as a binder onto filter paper or other suitable substrate.

The emulsions are aqueous colloidal dispersions containing 20% to 70% solids of an emulsion copolymer consisting essentially of 65 to 90 wt % vinyl chloride and 5 to 35 wt % ethylene prepared in the presence of a stabilizing system consisting essentially of 3 to 15 wt % polyvinyl alcohol and 4 to 10 wt % tetramethylol glycoluril wherein the weight percentages are based upon the total weight of the emulsion copolymer.

The copolymer may additionally contain up to 10 wt % of a hydroxyalkyl- or carboxylic acid-containing functional comonomer such as acrylic acid, a $C_2$-$C_4$ hydroxyalkyl (meth)acrylate such as hydroxyethyl acrylate or hydroxypropyl acrylate, N-methylol acrylamide and acrylamidoglycolic acid.

Filter paper formed by impregnating nonbonded filter paper with the disclosed polyvinyl alcohol-stabilized EVCl copolymer emulsions followed by curing under acidic conditions and heating exhibits superior resistance to degradation caused by hot oil. The amount of binder, calculated on a dry basis, applied to the fiber paper is that amount sufficient to bind the paper together to form a self-sustaining web and typically ranges from about 3 to 50 wt % of the filter paper.

These water-based binder compositions overcome solvent emission concerns associated with current filter saturant binders based on solvent phenolic systems. Moreover, the product formed by impregnating a nonwoven substrate with the subject binder compositions exhibits physical properties comparable to binder compositions prepared with solvent based phenolic and epoxy systems while overcoming the short pot life, increased handling and production costs and phase incompatibility problems that accompany use of such solvent based binder systems.

DETAILED DESCRIPTION

The present invention pertains to a polyvinyl alcohol-stabilized aqueous dispersion or emulsion of an ethylene-vinyl chloride (EVCl) copolymer and tetramethylol glycoluril (TMGU) and filter paper formed by impregnating nonbonded filter paper or other suitable substrate with such emulsions. The emulsions are prepared by incorporating 4 to 10 wt % tetramethylol glycoluril into an aqueous colloidal dispersion containing 20% to 70% solids of a copolymer prepared by the emulsion polymerization of a monomer mixture sufficient to provide a copolymer consisting essentially of 65 to 90 wt % vinyl chloride and 5 to 35 wt % ethylene. The copolymer is prepared in the presence of a stabilizing system consisting essentially of 3 to 15 wt % polyvinyl alcohol which is preferably 70 to 91 mole % hydrolyzed.

The preferred emulsions are prepared by incorporating 5 to 8 wt % TMGU, based upon the total weight of the emulsion copolymer, into an aqueous colloidal dispersion containing 40% to 60% solids of a copolymer consisting essentially of 75 to 85 wt % vinyl chloride and 15 to 25 wt % ethylene prepared in the presence of a stabilizing system consisting essentially of 4 to 10 wt % polyvinyl alcohol which is 85 to 89 mole % hydrolyzed.

The EVCl copolymers may optionally contain up to 10 wt %, preferably about 1 to 5 wt %, of a hydroxyalkyl- or carboxylic acid-containing functional comonomer which is copolymerizable with vinyl chloride and ethylene. The preferred functional comonomers are acrylic acid and a $C_2$–$C_4$ hydroxyalkyl (meth)acrylate such as hydroxyethyl acrylate and hydroxypropyl acrylate.

Tetramethylol glycoluril (TMGU) is conveniently added in-situ during the initial polymerization of the vinyl chloride and ethylene or by post addition to the formed EVCl copolymer emulsion. A method for preparing TMGU is disclosed in U.S. Pat. No. 4,064,191, the specification which is incorporated by reference herein. The compound can be prepared in high yield (approaching 90%) and is a crystalline solid having a melting point of 132°–136° C. TMGU is sold commercially by American Cyanamid Company, Hayne, New Jersey, under the trademark CYMEL ® 1172 Resin and is represented by the formula:

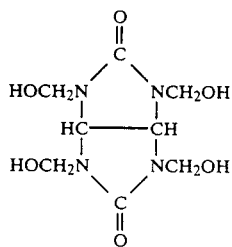

TMGU can be conveniently added to aqueous emulsions containing polyvinyl alcohol-stabilized EVCl copolymers which are known in the art. Representative of such emulsion copolymers and methods of preparing the same are disclosed in U.S. Pat. No. 4,714,731 the specification which is incorporated by reference herein.

Suitable EVCl copolymer emulsions are prepared by copolymerizing the monomers in the presence of suitable emulsifying agents. i.e., protective colloids and surfactants, in an aqueous medium under pressures generally not exceeding about 100 atm and in the presence of a redox system which is added incrementally. The copolymerization reaction is performed under an ethylene pressure which is sufficient to provide the copolymer with about 5 to 35 wt % ethylene content, preferably about 15 to 25 wt %. Pressures of about 50 to 100 atm are generally used to afford such an ethylene content. When the vinyl chloride content is less than about 65 wt %, the requisite ethylene pressure required to run the polymerization is difficult to handle and at greater than about 90 wt % vinyl chloride, stability of the emulsion becomes a problem.

The EVCl copolymer emulsions may additionally contain from 0.1 to 30 wt % of an external crosslinking agent based upon the total weight of the copolymer. Suitable external crosslinking agents include melamine/formaldehyde resins, polyisocyanates such a water dispersible polymeric methyl diphenyl diisocyanates and water based phenolic resins.

In carrying out the polymerization, substantially all of the polyvinyl alcohol and a portion of the vinyl chloride is initially charged into the polymerization vessel which is then pressurized with ethylene. Most advantageously, at least about 5 wt % and preferably, at least about 15 wt % of the total vinyl chloride to be polymerized is initially charged into the reactor. The remainder of the vinyl chloride is added, desirably at a substantially uniform rate, after the initially charged vinyl chloride monomer content has been substantially reduced as evidenced by a decrease in the rate of polymerization. This controlled addition avoids overpressurization of the reactor. No more than about 60% of the vinyl chloride should be charged initially since a prepolymer must be generated in-situ in order to obtain the desired stable emulsions.

The quantity of ethylene entering the copolymer is influenced by the pressure, the mixing, the addition rate and amount of free radical generating source. The ethylene content of the copolymer can be increased by utilizing a higher ethylene pressure, increasing agitation during mixing or employing a higher free radical source rate.

The process of forming the disclosed EVCl copolymer emulsions generally comprises preparing an aqueous solution containing substantially all of the polyvinyl alcohol dispersing agent. This aqueous solution and the initial charge of vinyl chloride are added to the polymerization vessel and ethylene pressure is applied to the desired value. The mixture is mixed thoroughly to dissolve ethylene in the vinyl chloride and into the water phase. The charge can be conveniently elevated to polymerization temperature during this mixing period. A polymerization temperature of about 55° C. and an ethylene pressure in the range of 750 psig to 1000 psig is required to provide a copolymer with about 20–30 wt % ethylene. Mixing can be effected by means of an agitator or other known mechanism.

The polymerization is initiated by introducing initial amounts of a free radical generating source into the reactor vessel containing the monomer premix. When employing a redox system, either the oxidant or reductant component can be added initially to the aqueous medium containing the polyvinyl alcohol and vinyl chloride with the other redox component added to initiate the reaction. Upon initiating the polymerization, any desired monomer such as the hydroxyalkyl- or carboxylic acid-containing functional comonomers disclosed herein may be added incrementally to the reaction vessel.

When reference is made to incremental addition, whether of vinyl chloride, functional comonomer, redox system or any other ingredient, continuous or intermittent, but preferably, uniform additions are contemplated. Such additions are also referred to as "delay" additions. After polymerization has begun, delay addition of the free radical generating source is used to continue polymerization until the prepolymer reaction is essentially completed as evidenced by a reduction in the rate of polymerization.

The rate of polymerization can be followed by plotting the temperature difference ($\Delta T$) between the reaction mixture and the reaction vessel jacket. The point at which $\Delta T$ begins to decrease corresponds to a reduction in the rate of polymerization. At this point, the remaining vinyl chloride is added incrementally along with additional free radical generating source and the remaining functional comonomer, if any, as delays to continue the polymerization.

When preparing an EVCl copolymer having a Tg of about 20° to 50° C., the ethylene pressure should not be added or withdrawn during the polymerization reaction. Instead, the ethylene pressure is permitted to increase, decrease or remain constant, i.e. float, and eventually to reduce gradually as ethylene in the sealed polymerization vessel is copolymerized. Once the requisite ethylene pressure is set in the reactor, the pressure will rise for a short period of time with initiation of polymerization as the vinyl chloride in which ethylene is soluble is reacted to yield the polymer in which ethylene is less soluble. After the initially charged vinyl chloride has been reacted and the vinyl chloride delay has begun, the pressure essentially stabilizes over the remaining polymerization period and eventually decays. This procedure avoids uncontrollable increases in ethylene pressure within the reaction vessel.

When preparing EVCl copolymers having a Tg of about 0° to 20° C., make-up ethylene may be used in suitable pressure reactors. Make-up ethylene is usually that amount of ethylene needed to maintain the initial pressure. Preferably, such copolymers can be formed by increasing the initial vinyl chloride monomer charge and increasing ethylene pressure, for example to 1000 psig.

The reaction is generally continued until polymerization is no longer self-sustaining and desirably until the residual vinyl chloride content is below 0.5%. The completed reaction product is removed from the presence of ethylene and maintained at a temperature above the Tg of the copolymer while sealed from the atmosphere. The reaction mixture can also be transferred to a degasser for removal of unreacted ethylene.

Another method for producing suitable EVCl copolymers comprises first forming an aqueous emulsion of vinyl chloride and the polyvinyl alcohol stabilizing system. The reactor is pressurized with ethylene and the resulting reaction mixture is adjusted to a temperature from about 10° to 30° C. Polymerization is initiated by adding a free radical source at a rate such that the reaction mixture is brought to a temperature from 45° to 85° C., preferably 50° to 60° C., within a period of 1 hour or less, preferably 30 minutes. The polymerization is continued until the polymerization rate begins to decrease. The major portion of the vinyl chloride is then added as a delay to the reaction vessel.

The dispersing agent, or protective colloid, used in preparing these stable emulsions is at least one polyvinyl alcohol. A single polyvinyl alcohol may be used alone or mixtures of different polyvinyl alcohols can be used. Suitable polyvinyl alcohols for practicing this invention are disclosed in U.S. Pat. No. 4,714,731, the specification which has been incorporated by reference. The amount of polyvinyl alcohol used in the polymerization reaction is about 3 to 15 wt %, preferably 4 to 10 wt %, based on monomers, substantially all of which is added initially to the aqueous medium, i.e. prior to initiation of polymerization. Use of less than about 3 wt % polyvinyl alcohol may result in unstable copolymer emulsions because of emulsion coagulum while use of an amount greater than 15% polyvinyl alcohol generally results in unsuitable emulsions having excessively high viscosity at commercially acceptable solids.

Additional amounts of polyvinyl alcohol can be added to the reaction mixture during polymerization provided that at least about 3 wt %, preferably at least about 4 wt %, polyvinyl alcohol is present in the reaction mixture upon initiation.

Polyvinyl alcohols suitable for use in the invention are 70 to 91 mole % hydrolyzed, preferably 85 to 89 mole % hydrolyzed, having a degree of polymerization (DPn) ranging from 200 to 4,000, preferably 500 to 2,500. A polyvinyl alcohol having a DPn at the lower end of the range, e.g. from 200 to about 400, should be used in combination with a polyvinyl alcohol having a higher DPn of about 500 or more. For example, Vinol® 203 polyvinyl alcohol (DPn about 250) when used alone did not afford a stable product, but in a 1:2 weight ratio with Vinol 205 polyvinyl alcohol (DPn about 550) stable emulsions were readily obtained if the Vinol 203 polyvinyl alcohol was added during the polymerization reaction (delay addition).

A polyvinyl alcohol resin having a degree of polymerization of less than about 2500 should be used in polymerization recipes containing up to about 8 wt % polyvinyl alcohol while a polyvinyl alcohol having a degree of polymerization of less than about 1000 should be used in recipes containing about 8 to 15 wt % polyvinyl alcohol.

The emulsions may additionally contain from 0.1 to 2 wt % sodium vinyl sulfonate or another polymerizable anionic surfactant, based on the vinyl chloride content of the copolymer, in order to improve emulsion stability and to enhance fiber wetting and penetration of the binder into the fibers of the filter paper.

Many of the well known emulsifying agents can be used including ionic surfactants such as sodium lauryl sulfate, sodium sulfosuccinate esters and amides, and sulfonated alkyl benzenes. The useful concentration of the total amount of emulsifying agents typically ranges from 0.5 to 5% based on the aqueous phase of the emulsion regardless of solids content.

Other protective colloids, such as the celluloses or hydroxyalkyl celluloses, or typical emulsifying agents such as ionic surfactants in combination with the polyvinyl alcohol may be used in amounts up to about equal proportions, preferably less than 50%, based on the weight of polyvinyl alcohol, although water resistance may be impaired.

Free radical sources known in the art such as redox systems are used in conventional amounts in practicing this invention. The polymerization is generally performed with quantities of redox system ranging from 0.03 to 3 wt % based on monomers. The reaction is initiated typically by adding the entire quantity of either the oxidant or reductant component of the redox system, or a substantial portion, into the reaction vessel at the beginning of the polymerization. The polymerization is conveniently controlled by metering the other component into the reaction vessel. The polymerization may also be controlled by the simultaneous metering in of both components.

While the use of conventional redox systems provides stable emulsions affording the improved properties discussed herein, the solvent resistance of substrates impregnated with these emulsions can be enhanced by conducting the polymerization in a salt-free aqueous environment. Accordingly, the oxidant and reductant of the redox system must be salt-free, i.e., nonionic. Suitable nonionic oxidizing agents or initiators include hydrogen peroxide and organic peroxy compounds.

Illustrative of the organic peroxides which can be used are alkylhydroperoxides such as t-butyl hydroperoxide, dialkyl peroxides such as di-tert-butyl peroxide, peroxy acids such as peracetic acid and perbenzoic acid, diacyl peroxides such as diacetyl peroxide and dilauroyl peroxide, and peroxy esters such as tert-butyl peracetate and tert-butyl perbenzoate. The preferred oxidant for use in the invention is hydrogen peroxide.

The reductant component of the redox system used in practicing this invention is a nonionic organic material such as a reducing sugar or other easily oxidizable polyhydroxy compound. Compounds frequently employed in this capacity are glucose, levulose, sorbose, invert sugar and ascorbic acid and its enantiomer erythorbic acid, citric acid and the like. Other useful organic reductants include hydroxyl amines, thiols, pentamines and tartaric acid.

The preferred redox catalyst system for making the stable emulsions of the present invention is hydrogen peroxide and ascorbic acid or erythorbic acid.

The oxidizing agent is generally employed in an amount from about 0.01 to 1.0 wt %. preferably 0.05 to 0.5 wt %, based on the monomers introduced into the polymerization system. The reductant is ordinarily added as an aqueous solution in the necessary equivalent amount. A reductant must be present in the polymerization recipe because the oxidant, in most cases, will not furnish free radicals rapidly enough at temperatures below about 80° C. to expeditiously effect polymerization of the monomers.

The salt-free redox catalyst system may also contain promoters such as ferrous sulfate in typically minor amounts. Such minor amounts of ionic materials do not adversely affect the water resistance of filter paper substrates impregnated with the disclosed polyvinyl alcohol-stabilized emulsions containing an ethylene-vinyl chloride copolymer and tetramethylol glycoluril.

The reaction temperature of the polymerization can be controlled by the rate of free radical source addition and by the rate of heat removal. Generally, a mean temperature of about 55° C. should be maintained during the polymerization of the monomers and temperatures much in excess of 80° C. should be avoided. While temperatures as low as 0° C. can be used, economically the lower temperature limit is about 30° C.

Aqueous dispersions containing EVCl emulsion copolymers can be produced having a solids content of between 20% and 70%. TMGU can be conveniently blended by post-addition into any commercially available polyvinyl alcohol stabilized EVCl copolymer emulsion and preferably to those containing a hydroxyalkyl- or carboxylic acid-containing functional comonomer. The TMGU can be added all at once or incrementally over the course of the blending operation with the latter being preferred. Such commercially available emulsions include AIRFLEX ® 4530 copolymer emulsion of ethylene, vinyl chloride and acrylamide. AIRFLEX is a registered trademark of Air Products and Chemicals, Inc., for copolymer emulsions.

The polyvinyl alcohol-stabilized emulsions containing an EVCL copolymer and TMGU may be used as binders in preparing filter paper wherein the bonded filter paper demonstrates enhanced resistance to degradation caused by hot oils and overcomes solvent emission concerns associated with current phenolic and epoxy based systems. The use of these emulsions can be extended to reusable heavy duty air filters and gasoline filters. Equally superior results are obtained whether the TMGU is added in-situ with the polymer premix or by post addition to the copolymer emulsion.

The following procedure is typically used to impregnate filter stock with the functionalized polyvinyl alcohol stabilized emulsions of the present invention. A cellulosic based filter media or other nonwoven substrate well known in the art is saturated with the emulsion and the treated stock is baked at 150°–200° F. (66°–93° C.) for 5–10 minutes to promote film coalescence and distribution of the binder into the filter matrix. The dried stock is cured at 250° to 350° F. (121°–177° C.) for 3 to 5 minutes or more. However, other time-temperature relationships can be employed as is well known in the art.

The following examples illustrate the preparation of polyvinyl alcohol stabilized EVCl copolymer emulsions wherein TMGU is reacted in-situ with the monomer premix and by post addition as a second stage to the copolymer emulsion.

EXAMPLE 1

POST ADDITION OF TMGU INTO AIRFLEX 4530 COPOLYMER EMULSION 200g of AIRFLEX 4530 copolymer emulsion (50% solids) was mixed while under agitation with 44 g of Cymel 1172 resin (80% active). The agitator speed was increased to 100 rpm and 610 g water were added. Agitation was maintained for fifteen minutes. The pH of the blend was tested and adjusted, if necessary, to a pH of 5.5 to 6.0. The blend contained 14% solids and had a viscosity of 20–50 cps.

EXAMPLE 2

IN-SITU ADDITION OF TMGU INTO A POLYVINYL ALCOHOL STABILIZED ETHYLENE-VINYL CHLORIDE COPOLYMER

This preparation is suitable for preparing a copolymer emulsion containing approximately 75 wt % vinyl chloride, 21 wt % ethylene, 6 wt % Cymel 1172 and 4 wt % hydroxyethyl acrylate. The following ingredients were added to a 1-gallon pressure reactor:

| INITIAL CHARGE | |
|---|---|
| Deionized water | 532.0 g |
| Sequestrine 30A[a] | 2.0 g |
| Ferric ammonium sulfate (5% soln) | 7.5 g |
| Vinol 205[b] (20% soln) | 460.0 g |

[a]Ethylenediamine tetraacetic acid sodium salt marketed by Ciba-Geigy as a 30% aqueous solution.
[b]An 87 to 89 mole % hydrolyzed PVOH marketed by Air Products and Chemicals, Inc.

The pH of the solution was adjusted to 4.0 with 5.5 g glacial acetic acid.

The reactor contents were purged three times with 25 psig ethylene while stirring at 200 rpm. Vinyl chloride monomer (180 g) and 28.5 ml of a 10% solution of erythorbic acid were then added to the reactor. The agitation was increased to 1100 rpm and the reactor contents were heated to 52° C. while pressurizing to 900 psig ethylene. The polymerization was initiated with 2% hydrogen peroxide solution following temperature and pressure equilibration. Upon initiation, a 10% erythorbic acid solution was also started. The oxidizing and reducing agents were added until essentially all of the vinyl chloride in the initial charge was polymerized. This was observed when the reactor jacket temperature approached the temperature (55° C.) of the reaction medium. Approximately 0.57 g hydrogen peroxide and 2.85 g erythorbic acid were consumed. At this point, 1061 g vinyl chloride monomer was added over a 3 hour period along with 585 g of an aqueous solution consisting of 63 g hydroxyethyl acrylate. 315 g Cymel 1172 (45% soln) and 207 g deionized water as a separate delay. Over this period 2.13 g hydrogen peroxide and 5.5 g erythorbic acid were added. The polymerization was continued for an additional 50 minutes until the water jacket temperature was equal to the reaction temperature and the polymerization was essentially complete. A total of 2.52 g hydrogen peroxide and 6.44 g erythorbic acid was consumed.

The reactor contents were transferred to a degasser vessel and the emulsion was treated under vacuum with 38 g vinyl acetate and 100 g of a 5% solution of tert-butyl hydrogen peroxide and 5 g of a 10% erythorbic acid solution. The emulsion copolymer had a Tg of 27.5° C. and the emulsion solids were 52.5%. The pH of the emulsion was adjusted to between 5 and 6 with ammonium hydroxide.

EXAMPLE 3

COMPARISON OF PROPERTIES AFFORDED BY SUBSTRATES IMPREGNATED WITH VARIOUS EVCl COPOLYMER EMULSIONS

Several runs were carried out wherein unsaturated filter stock was impregnated with the emulsions described in Runs 2 through 11 of Table 1. The cellulosic based filter media was saturated with the emulsion and the treated stock was baked at 150°-200° F. (66°-93° C.) for 5-10 minutes to promote film coalescense and distribution of the binder into the filter matrix. The dried stock was cured at 250° to 350° F. (121°-177° C.) for 3 to 5 minutes. However, other time-temperature relationships can be employed as is well known in the art.

The following experimental procedure was utilized in testing physical properties of filter paper impregnated with the TMGU-containing EVCl copolymer emulsions: H & V oil filter stock was cut into 4" by 10" pieces. Four sheets were used in testing each formulation. Each sheet was weighed and impregnated with a test formulation having 14.5% solids to obtain a 25% binder add-on. The binder emulsion was applied to the filter paper using the Atlas padding technique at 105 lbs. under full arm load. Each impregnated sheet was cured and dried for 15 minutes at 300° F. (148.9° C.) and evaluated using the Gurley stiffness and MIT fold tests. The experimental procedures utilized are described in the following standard tests which are incorporated by reference herein:

Gurley Stiffness: TAPI T543PM-85
MIT Fold test: TAPI T5110M-83

Table 1 discloses the composition of the emulsions designated as run 2 through 12. Run 8 was prepared according to the experimental procedure described in Example 2. The remaining runs were prepared according to the procedures enumerated herein. In those runs in which a terpolymer was made, the hydroxy- or carboxylic acid-containing comonomer was added as a delay upon initiation of the polymerization reaction.

Referring now to Table 1, Run 1 presents MIT and Gurley stiffness results for the untreated base filter stock. Comparison of Run 2 and Runs 4-11, inclusive, illustrates the improved properties afforded by applying polyvinyl alcohol-stabilized EVCl emulsions onto a filter paper substrate. For example, the untreated substrate of Run 1 exhibited an MIT fold result of 10 while the substrates treated with the polyvinyl alcohol stabilized EVCl emulsions of Runs 4-11 provided MIT fold results ranging from 212 to 2022. Runs 4-11 exhibited substantially improved wet Gurley stiffness following treatment with hot oil compared to Runs 1 and 2 and retained from 80 to 100% of dry stiffness upon wetting in hot oil.

Run 3 demonstrates that the addition of 20% Cymel 481 (a melamine/formaldehyde resin) causes a substantial decrease it MIT fold compared to the the surfactant stabilized emulsion of run 2. However, this external crosslinking agent provides a slight improvement in both wet and dry Gurley stiffness compared to Run 2.

Runs 4-6 illustrate the effect of adding 10% acrylic acid in addition to other modifiers on filter paper properties. Run 5 afforded a substantial improvement in Gurley stiffness and MIT fold compared to the unsaturated basestock and surfactant-stabilized EVCl impregnated substrates of Runs 2 and 3, respectively. Runs 5 and 6 demonstrate that the addition of an external crosslinking agent (Cymel 481) into a polyvinyl alcohol stabilized EVCl emulsion containing 10% acrylic acid results in a sharp decrease in MIT fold but improves the Gurley stiffness following hot oil treatment.

Comparison of Runs 7 and 8-11 demonstrates the improved properties afforded by the addition of 4% hydroxyethyl acrylate, tetramethylol glycoluril and external crosslinkers such as melamine/formaldehyde, phenolic resins and polymeric isocyanates. Run 8, which discloses a substrate impregnated with an EVCL emulsion containing 4% hydroxyethyl acrylate and 9% TMGU provides 90% retention of dry Gurley following treatment with hot oil and an MIT value of 1000. In contrast, Runs 9-11, which contain external crosslinkers, provide up to 100% retention of dry Gurley stiffness following treatment with hot oil but show substantially decreased in MIT fold.

Filter paper impregnated with the disclosed emulsions exhibit an unexpected improvement in strength and flexibility and can be utilized for a wide variety of applications. These water-based binder compositions overcome the solvent emission concerns associated with current solvent based phenolic and epoxy systems. Moreover, products formed by impregnating a substrate with these binder compositions exhibit physical properties comparable to current binder compositions without the necessity for the separate addition of an external crosslinking agent which typically reduces pot life, increases handling and production costs and presents compatibility problems.

STATEMENT OF INDUSTRIAL APPLICATION

The invention provides polyvinyl alcohol-stabilized emulsions containing an ethylene-vinyl chloride copolymer emulsions and tetramethylol glycoluril which are useful as binders in the preparation of filter paper.

TABLE 1

| | Unsaturated Base- | A-4530 Surfactant-Stabil- | A-4530 + 20% Cymel | 10% AA | 10% AA Mod EVCl/ PVOH + 10% Cymel | 10% AA Mod EVCL/ PVOH + 20% Cymel | 4% HEA Mod EVCl/ |
|---|---|---|---|---|---|---|---|

TABLE 1-continued

| | stock | ized | 481 | Modified | 481 | 481 | PVOH |
|---|---|---|---|---|---|---|---|
| Run | 1 | 2 | 3 | 4 | 5 | 6 | 7 |
| Vinyl Chloride (%) | — | 83 | 83 | 80 | 80 | 80 | 81 |
| Ethylene (%) | — | 15 | 15 | 10 | 10 | 10 | 15 |
| Comonomer (%) | — | 2 | 2 | 10 | 10 | 10 | 4 |
| | | NMA | NMA | AA | AA | AA | HEA |
| Polyvinyl Alcohol (%) | — | 0 | 0 | 6 | 6 | 6 | 6 |
| Redox System | — | * | * | $H_2O_2$ | $H_2O_2$ | $H_2O_2$ | $H_2O_2$ |
| Tetramethylol Glycoluril | | | | | | | |
| Tg (°C.) | — | 30 | 30 | 37 | 37 | 37 | 30 |
| Solids (wt %) | — | | | | | | |
| Crosslinker (%) | — | — | 20% | | | 20% | |
| | | | Cymel 481 | | | Cymel 481 | |
| % Add-On | 0 | 23 | 24 | 24 | 23 | 24 | 25 |
| MIT Fold | 10 | 1000 | 210 | 1431 | 1024 | 350 | 2022 |
| Gurley Stiffness | | | | | | | |
| Dry (D) | 1300 | 2800 | 3025 | 2870 | 3645 | 3984 | 2498 |
| 300° F., Oil, 41 hr (W) | 1300 | 1900 | 2000 | 2400 | 3606 | 3550 | 2000 |
| % Retention W/D × 1 | — | 68 | 65 | 84 | 99 | 89 | 80 |

| | 4% HEA 9% TMGU | 4% HEA EVCl/PVOH 20% Cymel 481 | 4% HEA EVCl/PVOH 20% BKUA phenolic +10% Cymel 481 | 4% HEA EVCl/PVOH 10% Cymel 481 + 10% Polymer MDI |
|---|---|---|---|---|
| Run | 8 | 9 | 10 | 11 |
| Vinyl Chloride (%) | 81 | 81 | 81 | 81 |
| Ethylene (%) | 15 | 15 | 15 | 15 |
| Comonomer (%) | 4 | 4 | 4 | 4 |
| | HEA | HEA | HEA | HEA |
| Polyvinyl Alcohol (%) | 6 | 6 | 6 | 6 |
| Redox System | $H_2O_2$ | $H_2O_2$ | $H_2O_2$ | |
| Tetramethylol Glycoluril | 9 | | | |
| Tg (°C.) | — | 30 | 30 | 30 |
| Solids (wt %) | | | | |
| Crosslinker (%) | | 20% | 20% | 10% |
| | | Cymel 481 | Cymel 481 20 BKUA | MDI |
| % Add-On | 23 | 23 | 24 | 24 |
| MIT Fold | 1000 | 212 | 364 | 371 |
| Gurley Stiffness | | | | |
| Dry (D) | 3161 | 3645 | 3767 | 2845 |
| 300° F., Oil, 41 hr (W) | 2850 | 3606 | 3212 | 2834 |
| % Retention W/D × 1 | 90 | 99 | 85 | 100 |

NMA = N-Methylol Acrylamide
AA = Acrylic Acid
HEA = Hydroxyethyl Acrylate
EA = Erythorbic Acid
TMGU = Tetramethylol glycoluril
Cymel 481 = A registered trademark of American Cyanamid Corporation for melamine/formaldehyde resins
MDI = Rubiconate 271, a registered trademark of Rubicon (IC) Inc., for water dispersible polymeric MDI.
BKUA = Bakelite 2370, a registered trademark of Union Carbide Corporation for water based phenolic resins.
* = $NH_4S_2O_4$

We claim:

1. A nonwoven product exhibiting resistance to degradation caused by hot oil comprising a nonwoven web of fibers bonded together with a copolymer deposited from an emulsion comprising an aqueous colloidal dispersion having (a) 20 to 70% solids of a copolymer consisting essentially of 65 to 90 wt % vinyl chloride, 5 to 35 wt % ethylene and up to 10 wt % of a hydroxyalkyl- or carboxylic acid-containing functional comonomer, the copolymer being prepared in the presence of a stabilizing system consisting essentially of 3 to 15 wt % polyvinyl alcohol which is 70 to 91 mole % hydrolyzed.

2. The nonwoven product of claim 1 wherein the carboxylic acid-containing functional comonomer is acrylic acid.

3. The nonwoven product of claim 1 wherein the hydroxyalkyl-containing functional comonomer is a $C_2$-$C_4$ hydroxyalkyl (meth)acrylate.

4. The nonwoven product of claim 3 wherein the $C_2$-$C_4$ hydroxyalkyl (meth)acrylate is hydroxyethyl acrylate.

5. The nonwoven product of claim 3 wherein the $C_2$-$C_4$ hydroxyalkyl (meth)acrylate is hydroxypropyl acrylate.

6. The nonwoven product of claim 1 wherein the copolymer contains from 0.1 to 30 wt % of a crosslinking agent.

7. The nonwoven product of claim 6 wherein the crosslinking agent is selected from the group consisting of a melamine/formaldehyde resin, a water dispersible polymeric methyl diphenyl diisocyanate and a water based phenolic resin.

8. A nonwoven product exhibiting resistance to degradation caused by hot oil comprising a nonwoven web of fibers bonded together with a copolymer deposited from an emulsion comprising an aqueous colloidal dispersion having (a) 20 to 70% solids of a copolymer prepared by the emulsion polymerization of a monomer mixture consisting essentially of 65 to 90 wt % vinyl chloride, 5 to 35 wt % ethylene and up to 10 wt % hydroxyalkyl-containing or carboxylic acid-containing functional comonomer in the presence of a stabilizing system consisting essentially of 3 to 15 wt % polyvinyl alcohol which is 70 to 91 mole % hydrolyzed and (b) 4 to 10 wt % tetramethylol glycoluril based upon the weight of the emulsion copolymer.

9. The nonwoven product of claim 8 wherein the tetramethylol glycoluril is post-added to the copolymer emulsion.

10. The nonwoven product of claim 8 wherein the copolymer is formed by the emulsion polymerization in the presence of the tetramethylol glycoluril.

11. The nonwoven product of claim 8 wherein the carboxylic acid-containing functional comonomer is acrylic acid.

12. The nonwoven product of claim 8 wherein the hydroxyalkyl-containing functional comonomer is a $C_2$–$C_4$ hydroxyalkyl (meth)acrylate.

13. The nonwoven product of claim 12 wherein the $C_2$–$C_4$ hydroxyalkyl (meth)acrylate is hydroxyethyl acrylate.

14. The nonwoven product of claim 12 wherein the $C_2$–$C_4$ hydroxyalkyl (meth)acrylate is hydroxypropyl acrylate.

15. A nonwoven product exhibiting resistance to degradation caused by hot oil comprising a nonwoven web of fibers bonded together with a copolymer deposited from an emulsion comprising an aqueous colloidal dispersion having (a) 40 to 60% solids of a copolymer prepared by the emulsion polymerization of a monomer mixture consisting essentially of 75 to 85 wt % vinyl chloride, 15 to 25 wt % ethylene and 1 to 5 wt % of a hydroxyalkyl-containing or carboxylic acid-containing functional comonomer prepared in the presence of a stabilizing system consisting essentially of 4 to 10 wt % polyvinyl alcohol which is 85 to 89 mole % hydrolyzed and (b) 5 to 8 wt % tetramethylol glycoluril based upon the weight of the emulsion copolymer.

16. The nonwoven product of claim 15 wherein the tetramethylol glycoluril is post added to the copolymer emulsion formed by the polymerization.

17. The nonwoven product of claim 15 wherein the copolymer is formed by the emulsion polymerization in the presence of the tetramethylol glycoluril.

* * * * *